United States Patent [19]

Takahashi

[11] Patent Number: 4,813,315
[45] Date of Patent: Mar. 21, 1989

[54] MULTI-SPINDLE LATHE
[75] Inventor: Kiyotada Takahashi, Shounan, Japan
[73] Assignee: Yachiyoda Kogyo Co., Ltd., Chiba, Japan
[21] Appl. No.: 50,334
[22] Filed: May 18, 1987
[51] Int. Cl.⁴ .............................................. B23B 19/02
[52] U.S. Cl. ........................................ 82/142; 82/124; 82/129
[58] Field of Search ............... 82/2 A, 2.5, 2.7, 3, 82/28 B, 28 A, 28.2, 30, 29.1, 29 A, 29 B, 29 R, 28 R, 2 R, DIG. 5, DIG. 8

[56] References Cited

U.S. PATENT DOCUMENTS

| | | | |
|---|---|---|---|
| 4,445,405 | 5/1984 | Champeau et al. | 82/2.5 |
| 4,455,900 | 6/1984 | Callanan et al. | 82/4 A |
| 4,563,925 | 1/1986 | Link | 82/28 R |

Primary Examiner—Frederick R. Schmidt
Assistant Examiner—Blynn Shideler
Attorney, Agent, or Firm—Sandler & Greenblum

[57] ABSTRACT

A multi-spindle lathe includes a pair of main spindles, a first spindle being located on one side of a main spindle head and a second spindle being located on an opposite side of the main spindle head. A supporting shaft extends through the main spindle head, and the head is selectively engageable with a head stock. The head stock is provided with an assembly for rotatably driving either of the main spindles when such spindle is positioned below the main spindle head, in order that a workpiece can be operated upon, while the spindle is positioned above the main spindle head in order for a workpiece to be attached or detached.

14 Claims, 4 Drawing Sheets

MULTI-SPINDLE LATHE

BACKGROUND OF THE INVENTION

1. Technical Field of the Invention

The present invention generally relates to a multi-spindle lathe, and more particularly to a multi-spindle lathe having a plurality of main spindles associated with respective chucks, in which the main spindles are supported on a main spindle head.

2. Discussion of Prior Art

Conventional lathes of the type noted above are usually provided with a plurality of main spindles and respective chucks on a main spindle head, with the respective chucks being situated or positioned along one side of the main spindle head.

As a result, these conventional types of lathes are inconvenient, insofar as when a work piece is adapted to be attached to, or detached from, any of the chucks of the main spindles, it will become necessary to stop rotation of all of the main spindles, resulting in an unnecessary loss of working time.

SUMMARY OF THE INVENTION

One object of the present invention is to provide a lathe which overcomes the above and other noted inconveniences. A lathe in accordance with the present invention is characterized in that a pair of main spindles having respective chucks are supported in a parallel fashion with each other on a main spindle head. Accordingly, respective chucks will be situated on both sides of the main spindle head, and the main spindle head will be supported, via a supporting shaft projecting from a symmetrical central point between a pair of main spindles, on a head stock. The main spindle head is supported by the head stock, is detachably engaged therewith, and is rotatable by over approximately 180°. As a result, the head stock is provided with driving means which can engage either of the main spindles.

In a first aspect of the present invention, a multi-spindle lathe is provided which comprises a pair of main spindles, each of said spindles supporting a respective chuck and being supported on a main spindle head. The pair of main spindles is positioned in a parallel fashion with respect to each other, wherein one of the chucks is situated on one side of the main spindle head, and a second one of the chucks is located on a second side of the main spindle head. The main spindle head is supported on the head stock by a support shaft which extends from a central portion of the spindle head located between the main spindles. Means are also provided for selectively engaging the main spindle head with the head stock and for rotating the main spindle head over over 180°. The head stock further comprises driving means adapted to be selectively engaged with the first and second main spindles.

The support shaft which projects from said main spindle head is slidably and rotatably supported on said head stock, and is adapted to be rotatably driven by an electric motor and slidably driven by a cylinder.

Each of the main spindle head and the head stock includes a facing surface disposed oppositely with respect to the other, each of said surfaces including a radially toothed engaging portion, said toothed portions being adapted to be selectively engaged with each other and thereby selectively rotatable with each other.

The driving assembly comprises a gear slidably mounted on a spline shaft, said spline shaft gear being adapted to be engaged with a gear provided on said main spindle head, said lathe further comprising an additional gear which is connected to an electric motor and which is adapted to engage said main spindle head gear.

In another aspect, the present invention provides a multi-spindle lathe comprising a main spindle head and at least two main spindles, a first spindle adapted to be positioned on one side of said main spindle head and a second main spindle adapted to be positioned along a second side of said spindle head, a slidable and rotatable support shaft attached to said main spindle head, and a head stock, wherein said main spindle head is adapted to selectively engage said head stock.

The lathe further comprises a driving assembly which is adapted to selectively engage each of said main spindles when each said spindle is positioned below said main spindle head. The driving means comprises a gear which is slidably mounted on a spline shaft. The spline shaft is selectively engageable with a main spindle head gear, a pulley engages the spline shaft gear via a belt, and an electric motor drives the pulley and each of the main spindles. Each of the main spindles supports a chuck; and the shaft supports at least one gear, wherein the gear and the shaft are rotatably driven by an electric motor.

The support shaft is rotatable over substantially 180°, and the lathe further comprises means for rotating the support shaft over substantially 180°.

The means for rotating the support shaft comprises means for moving one of the main spindles from a position above said main spindle head to a position below said main spindle head and for moving the other of said main spindles from a position below said spindle head to a position above said main spindle head.

The lathe further comprises a piston mounted on a cylinder attached to the head stock, wherein the piston and cylinder assembly together comprise means for slidably driving the support shaft.

The means for slidably moving the support shaft further comprises at least two oil passageways provided in said cylinder.

The main spindle head comprises at least one surface having a radially toothed engaging portion which is adapted to selectively engage a radially toothed engaging portion on a side surface of the head stock which faces the at least one surface of the main spindle head.

BRIEF DESCRIPTION OF THE DRAWINGS

The above and other objects, features and advantages of the present invention will be discussed with respect to the accompanying drawings, in which like reference numerals represent similar parts throughout the several views, and wherein.

DETAILED DESCRIPTION OF THE DRAWINGS

Figure 1:
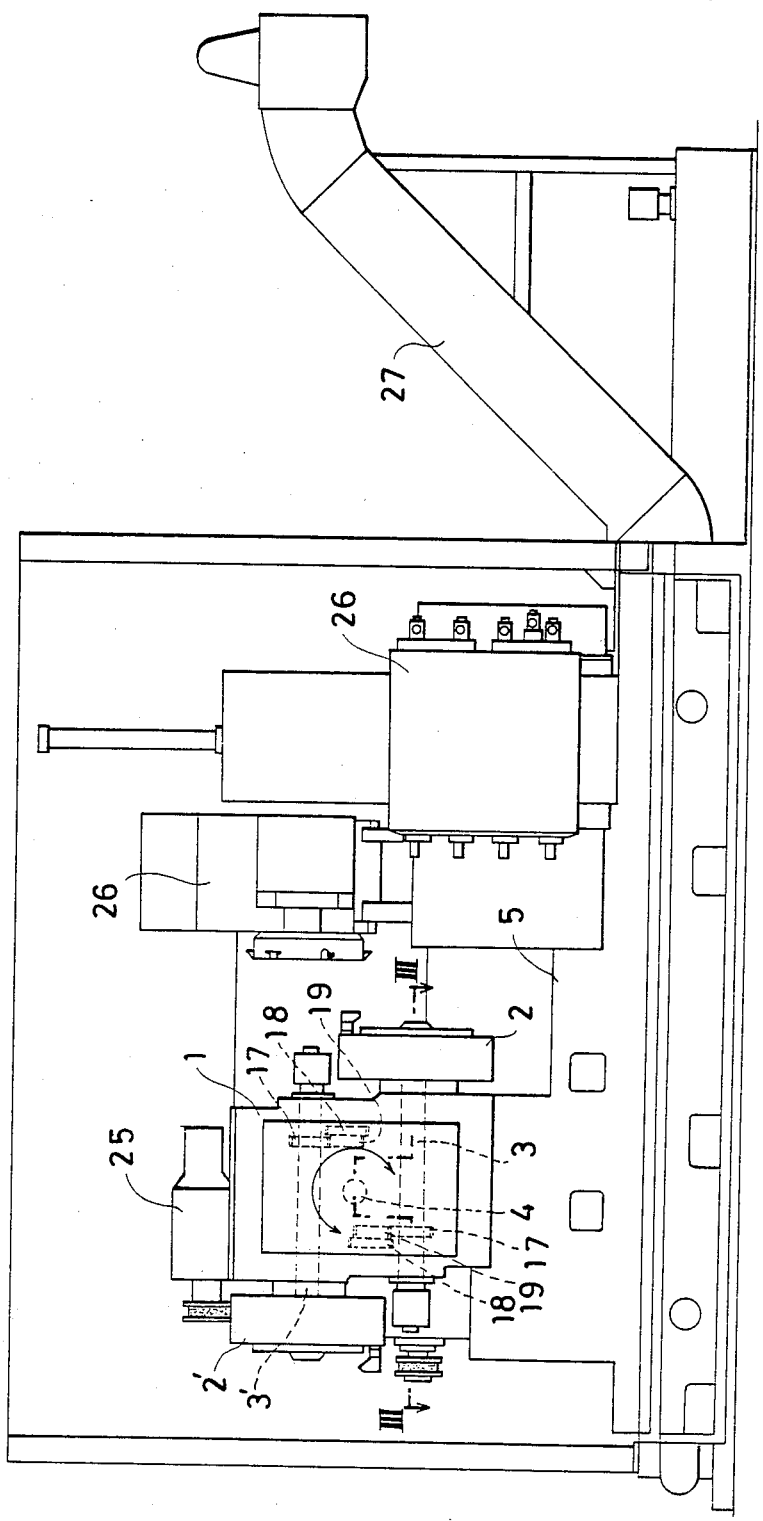
FIG. 1 is a front plan view of a first embodiment of a lathe formed in accordance with the present invention.
Figure 2:
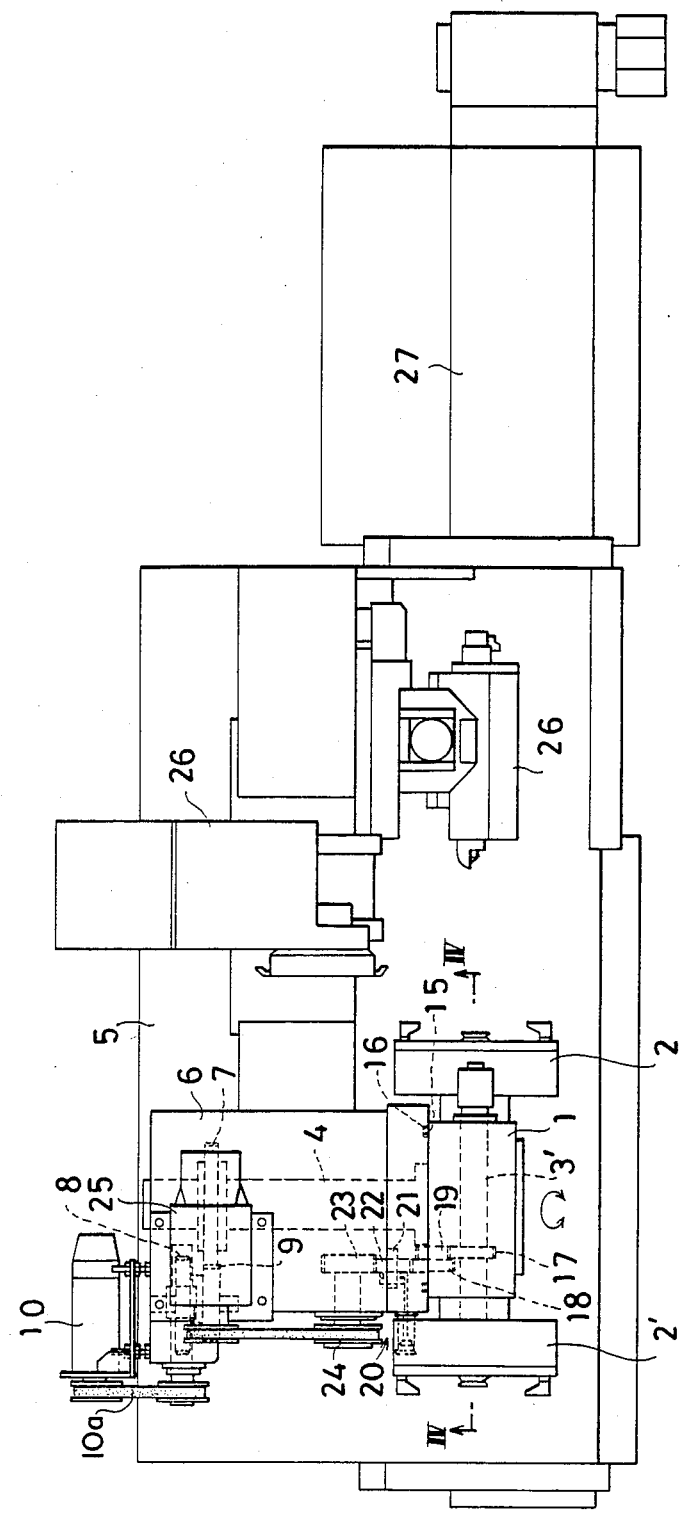
FIG. 2 is a top plan view of the lathe of FIG. 1

Referring more specifically to FIG. 1, the present invention includes a main spindle head 1, a pair of main (first and second) spindles 3 and 3' having respective (first and second) chucks 2 and 2' supported thereon, in parallel with each other, on main spindle head 1. In this fashion, respective chucks 2 and 2' are disposed on opposite sides of main spindle head 1. In the example illustrated, one of the main spindles 3' is on an upper side of the spindle head, and the other spindle (3) is located on a lower side, as clearly shown in FIG. 1.

Main spindle head 1 includes a symmetrical middle point positioned between the two main spindles 3 and 3'. A support shaft 4 projects from the middle point position of the main spindle head at a right angle with respect to main spindles 3 and 3', and the main spindle head 1 is supported, via support shaft 4, on a head stock 6 attached to a bed 5. The main spindle head is therefore turnable and slidable on the head stock.

In order to turn support shaft 4, a first gear 7 fixed to shaft 4 meshes with a second gear 9 which is coaxial with worm wheel 8. As a result, a worm gear (not illustrated), which meshes with worm wheel 8 and which is connected to an electric motor 10 via a belt 10a so that shaft 4 can be driven to turn via operation of electric motor 10. As a result of this turning movement of support shaft 4 over 180°, main second spindle 3', initially located at the upper position with respect to the spindle head 1, is moved to a position on the lower side of the main spindle head, and first main spindle 3; initially located on the lower side of the spindle, is rotated into a position on the upper side of the main spindle head 1.

Figure 3:
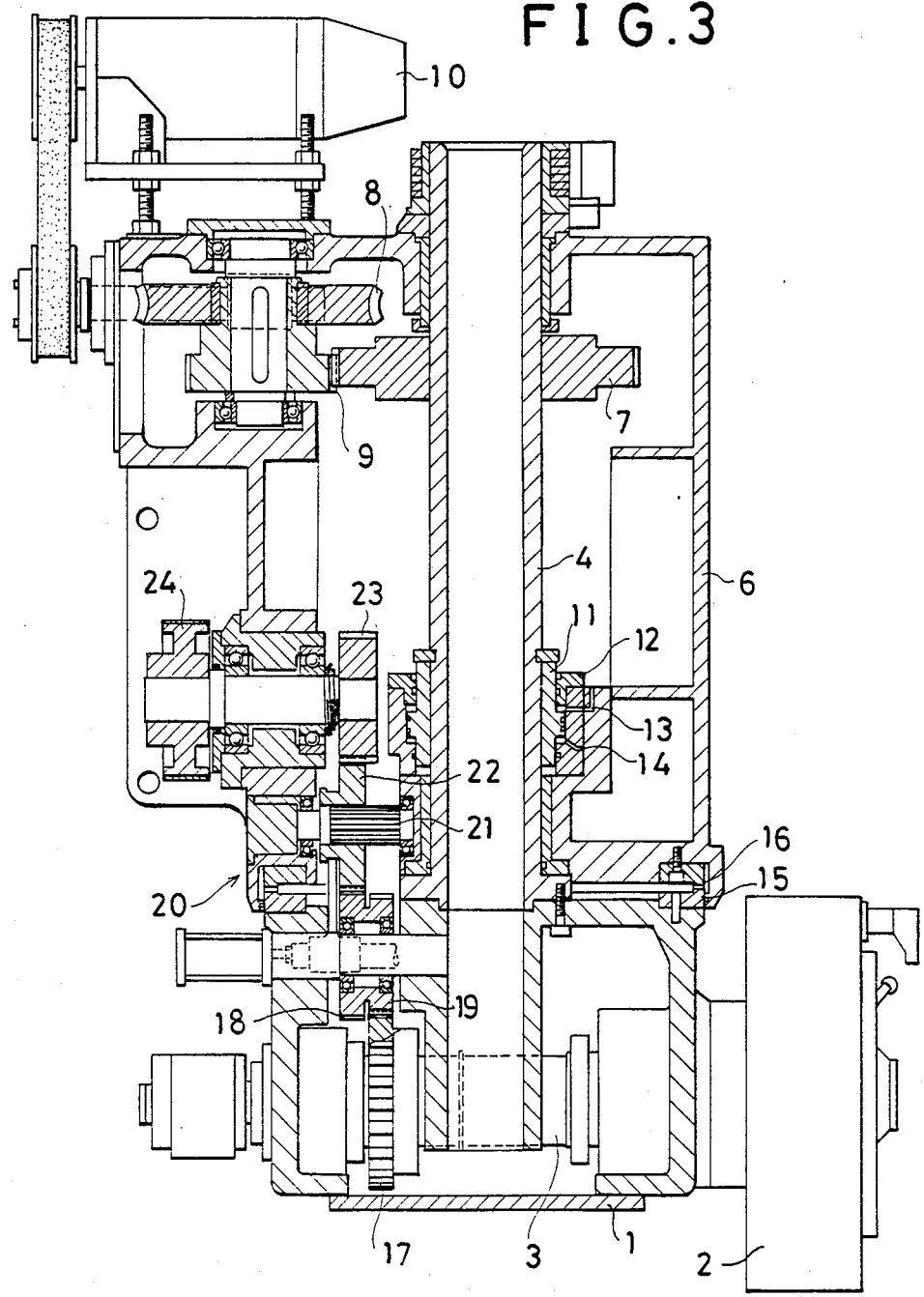
FIG. 3 is a sectional view of the lathe taken along line III—III of FIG. 1.
Figure 4:
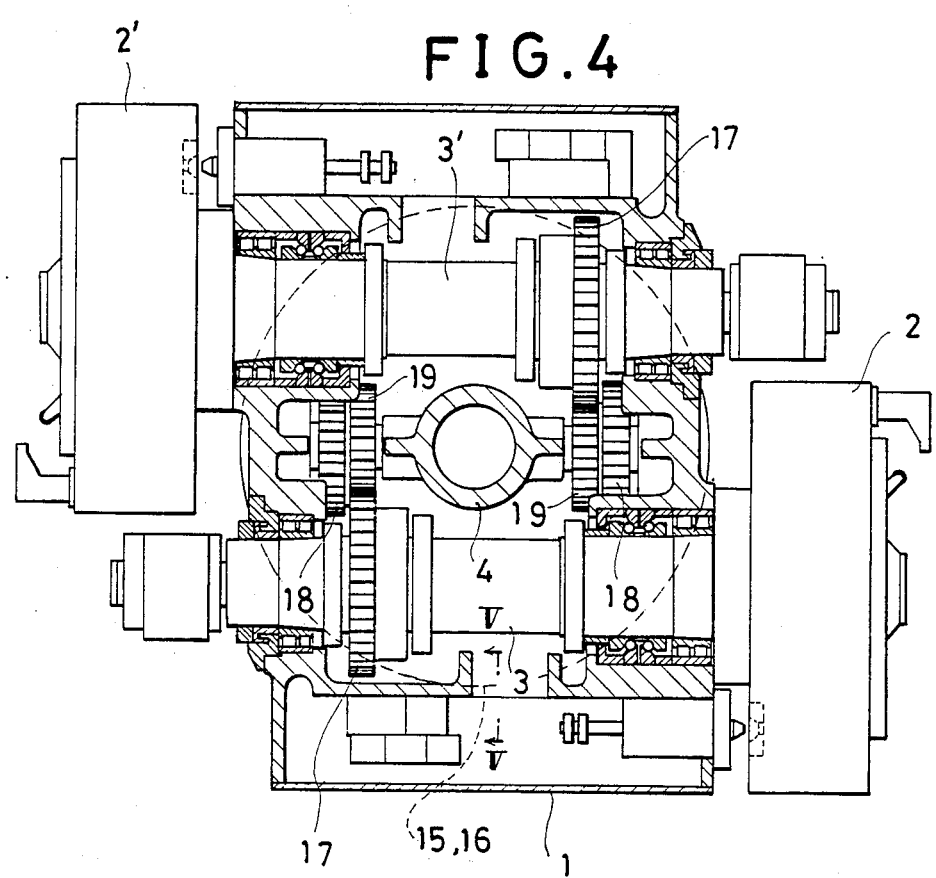
FIG. 4 is a sectional view of the lathe taken along line IV—IV of FIG. 2.

In order to encourage sliding movement of support shaft 4, a piston 11 attached to shaft 4 is mounted in an operation cylinder 12 attached to head stock 6 so that support shaft 4 can be slidably driven by the changeover operation of a pair of first and second oil passages 13 and 14 which are provided along one side or end of cylinder 12, as best seen in FIG. 3.

Figure 5:
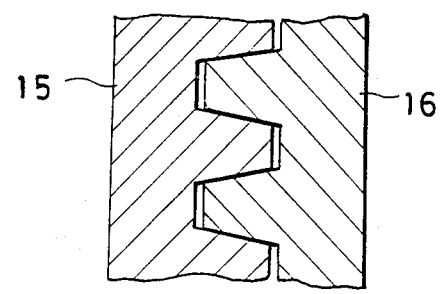
FIG. 5 is a sectional view of the lathe taken along line V—V of FIG. 4.

As a result of this sliding movement of the support shaft 4, an engaging poriton 15 on one side surface of main spindle head 1 is radially toothed and is adapted to selectively engage and disengage a radially toothed engaging portion 16 on a side surface of head stock 6 which is located oppositely from the surface of main spindle head 1. The interlocking teeth are best illustrated in FIG. 5. In this fashion, the main spindle head 1 can be fastened to rotate or unfastened to stop rotation thereof with respect to head stock 6.

A pair of main spindles 3, 3' are positioned on an upper side and on a lower side of the main spindle head as described above, and are adapted to be selectively engaged with a driving source 20 only when one of the spindles is positioned at the lower position with respect to the main spindle head. In order to rotate or turn whichever main spindle 3 or 3' which is positioned at the lower position (with respect to the main spindle head), a fourth gear 17 attached to each spindle 3, 3' meshes with a fifth gear 19 coaxially positioned with a sixth gear 18 supported on main spindle head 1. Gear 18 thus detachably meshes with driving assembly 20.

In greater detail, driving assembly 20 comprises a seventh gear 22 which is slidably mounted on a spline shaft 21 so as to be selectively engageable with gear 18, and a pulley 24 is provided coaxially with an eighth gear 23 which meshes with gear 22; and, an electric motor 25 is connected, via a belt, to pulley 24 so that main spindle 3 can be driven to rotate by electric motor 25.

Referring more specifically to the drawings, a tool unit 26 is provided as is a chip conveying poriton 27.

Operation of the present invention will hereinafter be described in greater detail: as illustrated in FIG. 3, when oil passage 14 is changed over so that it is connected to a high pressure side, support shaft 4 moves to cause the toothed engaging portion 15 of main spindle head 1 to engage the toothed connecting portion 16 of head stock 6. As a result, main spindle head 1 is fastened to head stock 6. When electric motor 25 is operated, main spindle 3, initially at a lower position with respect to the main spindle head, is turned or rotated to work on a workpiece attached thereto; at the same time, a workpiece is attached to chuck 2' of main spindle 3' (initially) along the upper position with respect to the main spindle head, and is not moved by electric motor 25.

Once the above-noted working on the workpieces has been completed, oil passageway 13 is changed over to the high pressure side, and support shaft 4 will be moved to cause the toothed engaging portion 15 of the main spindle head 1 to release from engagement with the toothed engaging portion 16 of head stock 6. Simultaneously, gear 22, which is mounted on spline shaft 21, is slidably moved so that engagement between gear 22 and gear 18 will be released. Thereafter, support shaft 4 is rotated by 180° via operating electric motor 10. As a result, the positional relationship between the two main spindles 3 and 3' will be changed over. Specifically, main spindle 3', initially located in the upper position over the main spindle head will then be changed over to the lower position. Under such conditions, oil passage 14 will be changed over again to the high pressure side to attach main spindle head 1 to head stock 6. Simultaneously, gear 22 will be slidably moved so that it will mesh with gear 23, so that a lathing operation will be effected by main spindle 3' at the lower position with respect to the main spindle head 1.

Thus, in accordance with the present invention, a pair of main spindles 3 and 3' having respective chucks 2 and 2' are alternatingly selected to be brought to face tool unit 26 by rotating main spindle head 1 over 180°. In this fashion, even during a lathing operation on a workpiece located on a chuck 2 of one main spindle 3 at one position of the spindle, a second workpiece is detached or attached to chuck 2' of the other workpiece, thereby reducing the loss of time in attaching and detaching the workpiece to the chuck. As a result, work time can be shortened and, additionally, main spindles 3 and 3' will be disposed symmetrically with respect to each other and in relationship to supporting shaft 4. In this fashion, the thermal deformation error of main spindles 3, 3' can be decreased, and accurate lathing work can be effected.

While the present invention has been described with respect to specific embodiments thereof, it should be clear to those of ordinary skill in the art that a variety of embodiments are contemplated which are within the scope of the present invention as defined by the present claims.

I claim:

1. A multi-spindle lathe comprising a main spindle head and at least first and second main spindles, each of said main spindles supporting a respective chuck and being supported on said main spindle head, said first main spindle being adapted to be positioned along one side of said main spindle head and said second main spindle being adapted to be positioned along a second side of said main spindle head, said main spindles being positioned in a parallel relationship with respect to each other, said main spindle head being supported on a head stock by a slidable and rotatable support shaft which is attached to said main spindle head, said support shaft extending from a central portion of said main spindle head which is located between said main spindles, means for selectively engaging said main spindle head with said head stock and for rotating said main spindle head over 180°, said head stock further comprising spindle driving means adapted to selectively engage said first and second main spindles, said main spindles being supported on said main spindle head in a direction which is transverse to said support shaft, said first and second main spindles being symmetrically positioned on opposite sides of said support shaft.

2. A multi-spindle lathe in accordance with claim 1, said support shaft being adapted to be rotatably driven by an electric motor and slidably driven by a cylinder.

3. A multi-spindle lathe in accordance with claim 1, wherein each of said main spindle head and said head stock has a facing surface disposed oppositely with respect to the other, each of said surfaces including a radially toothed engaging portion, said toothed portions being adapted to be selectively engaged with each other and thereby selectively 4. A multi-spindle lathe in accordance with claim 1, wherein said driving means comprises a gear slidably mounted on a spline shaft, said spline shaft gear being adapted to be engaged with a gear provided on said main spindle head, said lathe further comprising an additional gear which is connected to an electric motor and which is adapted to engage said main spindle head gear.

5. A lathe in accordance with claim 1 wherein said main spindle head comprises at least one surface having a radially toothed radially portion which is adapted to selectively engage a radially toothed engaging portion on a side surface of said head stock which faces said at least one surace of said main spindle head.

6. A lathe in accordance with claim 1, said driving means compising a driving assembly which is adapted to selectively engage each of said main spindles when each said spindle is positioned below said main spindle head.

7. A lathe in accordance with claim 6 wherein said driving assembly comprises a gear slidably mounted on a spline shaft, said spline shaft gear being selectively engageable with a main spindle head gear, a pulley engaged with said spline shaft gear by a belt, and an electric motor for driving said pulley and each said main spindle.

8. A lathe in accordance with claim 1 wherein each of said main spindles supports a chuck.

9. A lathe in accordance with claim 1 wherein said shaft supports at least one gear, said gear and shaft being rotatably driven by an electric motor.

10. A lathe in accordance with claim 1, wherein said support shaft is rotatable over substantially 180°, wherein said means for rotating said main spindle head over substantially 180° is adapted to rotate said support shaft over 180°.

11. A lathe in accordance with claim 10, wherein said means for rotating said main spindle head comprises means for moving one of said main spindles from a position above said main spindle head to a position below said main spindle head and for moving a second one of said main spindles from a position below said spindle head to a position above said main spindle head.

12. A lathe in accordance with claim 1 further comprising a piston mounted on a cylinder attached to said head stock, said piston and cylinder together comprising means for slidably driving said support shaft.

13. A lathe in accordance with claim 12, wherein said means for slidably moving said support shaft further comprises at least two oil passages.

14. A lathe in accordance with claim 13, wherein said oil passages are positioned within said cylinder.

* * * * *

UNITED STATES PATENT AND TRADEMARK OFFICE
CERTIFICATE OF CORRECTION

PATENT NO. : 4,813,315

DATED : March 21, 1989

INVENTOR(S) : Kiyotada TAKAHASHI

It is certified that error appears in the above-identified patent and that said Letters Patent is hereby corrected as shown below:

At column 3, line 43, change "poriton" to ---portion---.

At column 3, line 50, change "fastened to rotate or unfastened to stop rotation" to ---fastened to stop rotation thereof or unfastened to be rotatable---.

At column 4, line 5, change "poriton" to ---portion---.

At column 5, line 29, insert ---rotatable with each other.--- after "selectively".

At column 5, line 40, change "radially portion" to ---engaging portion---.

At column 6, line 2, change "surace" to ---surface---.

At column 6, line 4, change "compising" to ---comprising---.

Signed and Sealed this

Twenty-fifth Day of June, 1991

*Attest:*

HARRY F. MANBECK, JR.

*Attesting Officer*   *Commissioner of Patents and Trademarks*